A. THOMAS.
ELEVATING TRUCK FOR VEHICLES.
APPLICATION FILED MAY 8, 1911.

1,064,871.

Patented June 17, 1913.

Witnesses

Inventor
Alfred Thomas
By C. C. Shepherd
Attorney

UNITED STATES PATENT OFFICE.

ALFRED THOMAS, OF BAINBRIDGE, OHIO.

ELEVATING-TRUCK FOR VEHICLES.

1,064,871.

Specification of Letters Patent.  Patented June 17, 1913.

Application filed May 8, 1911. Serial No. 625,846.

*To all whom it may concern:*

Be it known that I, ALFRED THOMAS, a citizen of the United States, residing at Bainbridge, in the county of Ross and State of Ohio, have invented certain new and useful Improvements in Elevating-Trucks for Vehicles, of which the following is a specification.

My invention relates to elevating trucks for vehicles and is particularly designed to provide a form of truck primarily applicable to motor vehicles and designed to provide a traveling structure of such form that the vehicle carried thereby, may be readily elevated for the purpose of maintaining its wheels out of contact with the ground. This is particularly desirable in the storage of motor vehicles having cushion or pneumatic tires, since the removal of these tires from contact with the floor or ground, tends to preserve them and lengthen their life. In the provision of a means to attain this end, my aim has been to provide a structure which will be extremely practical owing to its inherent simplicity and which will, at the same time, completely fulfil all of the requirements of a device of this type.

More specifically, my invention takes the form of a base structure with casters thereon to render it readily movable and a superstructure connected to said base structure by vertical adjusting means of such form that a simultaneously vertical movement of all points of the super-structure may be attained by the rotation of a single crank handle. Furthermore, there is provided a means for readily obtaining the correct tension of the operating elements.

Figure 1:
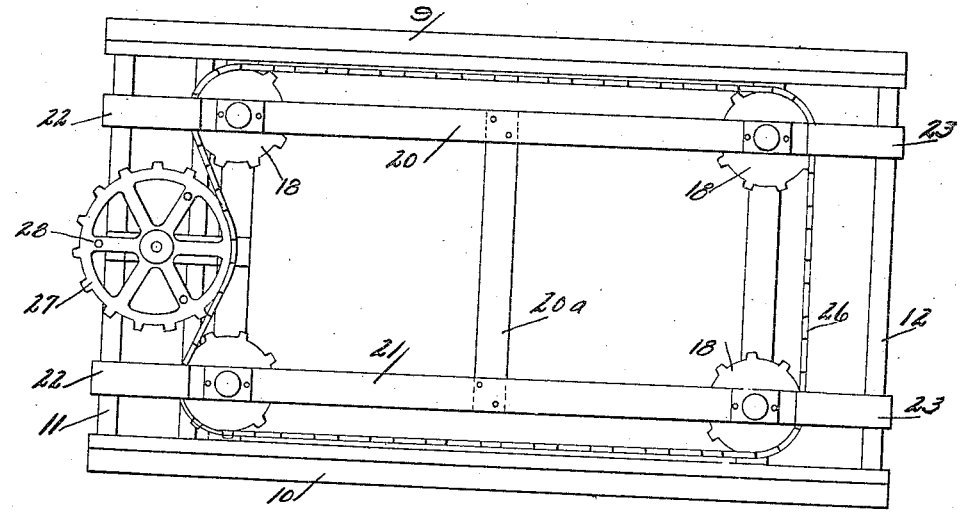
Figure 2:
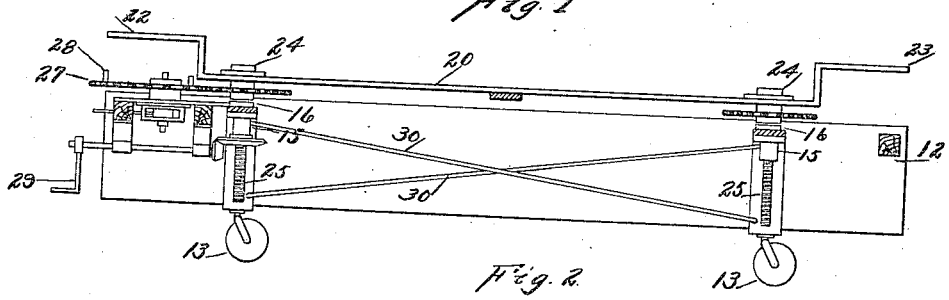
Figure 3:
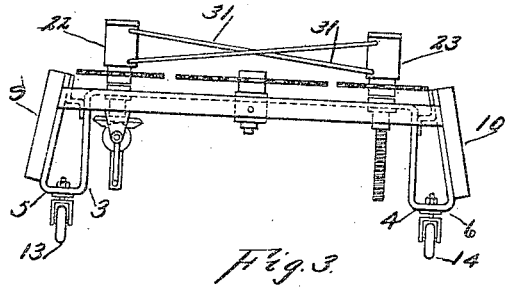
Figure 4:
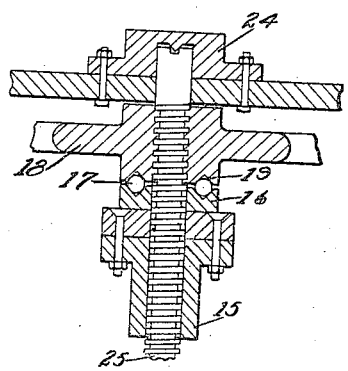

Referring specifically to the drawings, in which similar characters of reference designate corresponding parts: Figure 1 is a top plan view of my trunk, Fig. 2 is a vertical longitudinal section, Fig. 3 is an end elevation, and, Fig. 4 is a detail view of the elevating screw.

The base structure of my device is preferably comprised of two transverse members 1 and 2 having downward extensions 3 and 4, outward extensions 5 and 6 and upwardly bent extremities 7 and 8. The extremities 7 and 8 are, respectively, connected together by longitudinally inclined guard-boards 9 and 10 having their ends joined by cross pieces 11 and 12. The outward extensions 5 and 6 form journals for casters 13 and 14. The cross pieces 1 and 2 are each provided with spaced bores which may have auxiliary journal pieces 15 and ball races 16 with anti-friction balls 17 mounted therein and forming anti-friction supports for the feed sprockets 18 likewise provided with annular recesses 19.

The super-structure comprises longitudinal strips 20 and 21, preferably of metal, and having vertically offset ends 22 and 23. Near each end of the strips 20 and 21 are provided crowns 24 forming attaching means for depending screw feed rods 25 adapted to work in the feed sprockets 18 and be elevated or lowered by rotation thereof. A cross piece 20ª may be provided for the bearings of the members 20 and 21. The rotation of these sprockets 18 is effected by the provision of an endless sprocket chain 26 encircling all of said sprockets 18 and driven by a main sprocket 27 which may be operated by the hand grips 28. Or the crank 29 geared to a sprocket 18, may be utilized. From the structure, it will be apparent that the sprocket 27 has its axis longitudinally adjustable for the purpose of taking up any unnecessary slack in the chain 26. The adjustment of the sprocket 27 is effected by the provision of a bearing box 27ª slidable in the bracket structure 27ᵇ and under the control of a threaded adjusting screw 27ᶜ. It will be apparent that rotation of the threaded adjusting screw 27ᶜ in one direction, causes the sprocket 27 to bear more heavily upon the sprocket chain 26 and to cause a tightening thereof around its sprocket 18. On the other hand, rotation of the adjusting screw in the opposite direction, relieves the sprocket chain 26 of pressure and consequently loosens the sprocket chain.

It is desirable in the construction of the base structure to provide pairs of braces 30 extending longitudinally on each side thereof and intersecting each other for increasing the rigidity of the structure. Also, it is deemed advisable to provide cross braces for the super-structure as shown at 31 in Fig. 3.

In operation, it will be apparent that the vehicle straddles the base structure longitudinally, being guided into position thereover by the inclined longitudinal boards 9 and 10, until its axles are above the offset ends 22 and 23 of the super-structure. The sprocket 27 is then rotated by means of its crank or by the hand grips thereon and such rotation causes the sprocket chain 26 to drive the sprockets 18 and feed the rod 25 to elevate the said super-structure and consequently the vehicle. When this is done, the truck may be wheeled to any point because of the casters 13 and 14.

The provision of the inclined longitudinal boards 9 and 10 upon the sides of my truck, is of importance for the reason that it practically insures a proper positioning of the vehicle over the truck. Primarily they serve the purpose of maintaining the knuckle joints and steering connections to the wheels in their proper position relative to the superstructure. When running an automobile onto my truck, the operator will steer the same by gaging its widest part to clear the same. Should he, however, not accurately gage it, the fore part of the wheel will strike the upper portion of the inclined side and will then necessarily swing the truck into its proper position. This is inevitable, for the reason that the wheels will first contact with the upper portion of the inclined boards and if the alinement is not exactly correct, they slide thereon in a manner calculated to move the truck into its proper position. Furthermore, the legs of the truck are guarded against contact by the wheels of the vehicle. Thus there is no danger of a vehicle wheel striking a leg of the truck and locking therein as is common with this type of devices.

It will be apparent from the above, that a simple structure has been devised which will at all times maintain the vehicle with its wheels removed from contact with the floor or ground and which at the same time will provide a ready means of transportation of the vehicle from point to point.

What I claim, is—

A portable elevating truck for vehicles comprising transverse base members, downwardly and outwardly inclined side boards carried by said members and extending longitudinally of the truck, a superstructure spanning the distance between said transverse members, vertically offset elongated extensions on the ends of said superstructure, and means for vertically adjusting said superstructure.

In testimony whereof I affix my signature in presence of two witnesses.

ALFRED THOMAS.

Witnesses:
EDWIN P. CORBETT,
JOSEPH P. EAGLESON.